US012743586B2

(12) United States Patent
Sunkari

(10) Patent No.: US 12,743,586 B2
(45) Date of Patent: Sep. 22, 2026

(54) METHOD AND SYSTEM OF CONTEXT WINDOW ENGINEERING FOR LARGE LANGUAGE MODELS FINE-TUNED FOR CONVERSATIONS

(71) Applicant: CDK GLOBAL, LLC, Hoffman Estates, IL (US)

(72) Inventor: Aravind Kumar Sunkari, Hyderabad (IN)

(73) Assignee: CDK Global, LLC, Austin, TX (US)

( * ) Notice: Subject to any disclaimer, the term of this patent is extended or adjusted under 35 U.S.C. 154(b) by 164 days.

(21) Appl. No.: 18/733,022

(22) Filed: Jun. 4, 2024

(65) Prior Publication Data

US 2025/0371281 A1 Dec. 4, 2025

(51) Int. Cl.

*G06F 40/35* (2020.01)
*G06F 40/40* (2020.01)
*H04L 51/02* (2022.01)

(52) U.S. Cl.

CPC .............. *G06F 40/35* (2020.01); *G06F 40/40* (2020.01); *H04L 51/02* (2013.01)

(58) Field of Classification Search

CPC .......... G06F 40/30; G06F 40/35; G06F 40/20; G06F 40/216; G10L 15/22; G10L 25/30; G10L 15/16

See application file for complete search history.

(56) References Cited

U.S. PATENT DOCUMENTS 10,970,321 B1 4/2021 Mapranath
11,748,577 B1 9/2023 Aberle
11,875,130 B1 1/2024 Bosnjakovic et al.
11,875,240 B1 1/2024 Bosnjakovic et al.
12,254,279 B1 * 3/2025 Cohen ..................... G06F 40/35
12,462,798 B1 * 11/2025 Srivastav .............. G06F 40/295
2019/0349320 A1 11/2019 Karuppusamy et al.

(Continued)

FOREIGN PATENT DOCUMENTS

WO 2024015319 A1 1/2024

OTHER PUBLICATIONS

Published in: arXiv 2312: 10997, Retrieval-augmented Generation for Large Language Models: a Survey, Gao, Y et al., http://doi.org/10.48550/arXiv.2312.10997, Jan. 5, 2024, 26 pages.

*Primary Examiner* — Mark Villena
(74) *Attorney, Agent, or Firm* — Stoel Rives LLP

(57) ABSTRACT

Methods and systems for context window management of large language models are disclosed. An example method includes: receiving a message in a user language; preprocessing the message; setting a static context based on a topic of the message for a text sequence including the message, if the topic is new or different from a topic of a preceding message; attaching the static context to a context window; attaching a long term dynamic context to the context window based on the message and one or more previous messages in the text sequence; attaching a short term dynamic context to the context window based on the message; providing the context window to a language model server; receiving a database access command based on the context window from the language model server; providing the database access command to a database; and receiving a result response to the database access command from the database.

28 Claims, 8 Drawing Sheets

(56) References Cited

U.S. PATENT DOCUMENTS

| | | | | |
|---|---|---|---|---|
| 2022/0269853 | A1 | 8/2022 | Itani | |
| 2023/0237053 | A1 | 7/2023 | Dangoor et al. | |
| 2023/0274086 | A1 | 8/2023 | Tunstall-Pedoe et al. | |
| 2023/0360388 | A1 | 11/2023 | Singh | |
| 2023/0385085 | A1 | 11/2023 | Singh | |
| 2025/0131121 | A1* | 4/2025 | Teng | G10L 15/30 |
| 2025/0217600 | A1* | 7/2025 | Ouyang | G06Q 30/0282 |
| 2025/0278564 | A1* | 9/2025 | Yuan | G06F 40/284 |
| 2025/0292016 | A1* | 9/2025 | Malkemus | H04L 51/02 |

* cited by examiner 230, 246

```
STATIC_CONTEXT = [
  {
    "role": "user",
    "content": "What are the top 3 months for dealer XXXXXXX in terms of SALES in 2020?"
  },
  {
    "role": "assistant",
    "content": "{\"recipient\":\"SERVER\", \"action\":\"QUERY\", \"message\":\"SELECT MONTH, SUM(XXXX) AS SALES FROM XXXXXX WHERE
dxxxxxxXX='XXXXXXX' AND XXXXXX='xxxxxx' AND YEAR(year FROM MONTH) = 2020 GROUP BY MONTH ORDER BY XXXX DESC LIMIT 3\"}"
  },
  {
    "role": "user",
    "content": "MONTH,SALES\n2020-07-01,2695.400000\n2020-01-01,21738.70000\n2020-03-01,20488.6000000"
  },
  {
    "role": "assistant",
    "content": "{\"recipient\": \"USER\", \"message\":\"The top 3 months for dealer XXXXXXX in terms of SALES in 2020 are:\nJuly 2020 with a total SALES of
2186695.40,\nJanuary 2020 with a total SALES of 2173738.72,\nMarch 2020 with a total SALES of 2017488.60.\"}."
  },
  {
    "role": "user",
    "content": "For txxxxxxASR SALES related question use SUM(SALES_TOP_PRICE) in select clause and use XXXXXX='ro_top' in the where clause."
  },
  {
    "role": "user",
    "content": "For txxxxxxASR SALES rrrrrrrr related question use XyXX='rxxxx' in the where clause."
  },
  {
    "role": "user",
    "content": "For txxxxxxASR SALES ssss related question use XyXX='sxxx' in the where clause."
  },
  {
    "role": "user",
    "content": "For txxxxxxASR SALES dddddddd related question use XyXX='dxxx' in the where clause."
  },
  {
    "role": "user",
    "content": "For lXXXXXASR SALES related question use XXXXXX='ro_xxxx' and xxxxxx_ID is NOT NULL in the where clause."
  },
  {
    "role": "user",
    "content": "For lXXXXXASR SALES rrrrrrrr related question get SUM(ro_xxxx_ASR_XXXX) in select clause. Dont use XyXX='rxxxx' condition in where clause"
  },
  {
    "role": "user",
    "content": "For lXXXXXASR SALES ssss related question get SUM(ro_xxxx_ASR_AXXXX) in select clause. Dont use XyXX='sxxx' condition in where clause"
  },
  {
    "role": "user",
    "content": "For lXXXXXASR SALES dddddddd related question get SUM(ro_xxxx_ASR_DXXXXX) in select clause. Dont use XyXX='dxxx' condition in where
clause."
  },
  {
    "role": "user",
    "content": "For pxxxxxASR related question use XXXXXX='ro_xxxx' and xxxxxx_ID is NOT NULL in the where clause."
  },
  {
    "role": "user",
    "content": "For pxxxxxASR rrrrrrrr related question get SUM(ro_xxxx_ASR_RXXXXX) in select clause. Dont use XyXX='rxxxx' condition in where clause"
  },
  {
    "role": "user",
    "content": "For pxxxxxASR ssss related question get SUM(ro_xxxx_ASR_AXXXXXX) in select clause. Dont use XyXX='sxxx' condition in where clause"
  },
  {
    "role": "user",
    "content": "For pxxxxxASR dddddddd related question get SUM(ro_xxxx_ASR_DXXXXX) in select clause. Dont use XyXX='dxxx' condition in where clause."
  }
]
```

```
DYNAMIC_CONTEXT_LONG_TERM=
[{'role': 'user',
 'content': 'For the enterprise E9999999, What was the total labor sales for the store - "SXXXX37XX" in Aug 2023?'},
 {'role': 'user',
 'content': 'For the enterprise E9999999, What was the total labor sales for the store - "SXXXX37XX" in Sep 2023?'},
 {'role': 'user',
 'content': 'For the enterprise E9999999, What was the effective parts sales for stores "SXXXX37XX and SBBBB11BB" in January 2023?'},
 {'role': 'user',
 'content': 'For the enterprise E9999999, What was the effective parts sales for stores "SXXXX37XX and SBBBB11BB" in Jan 2022'},
 {'role': 'user',
 'content': 'For the enterprise E9999999, What was the PARTS sales for the store - "SDDDD37XX" in NOVEMBER 2009?'},
 {'role': 'user',
 'content': 'For the enterprise E9999999, What was the PARTS sales for the store - "SDDDD37XX" in Dec 2009?'},
 {'role': 'user',
 'content': 'For the enterprise E9999999, For each month of the year 2022, for the dealer D9988766, who are the top 3 employees in terms of cumulative monthly labor sale?'}]
```

```
DYNAMIC_CONTEXT_SHORT_TERM =
  [{'role': 'user',
   'content': 'For the enterprise E9999999, What was the total labor sale (sum(XXXXXXX_XXXXXX_sale))s for the store - "SXXXX99XX" in April 2023? Get me the store-wise list. Use XXXXXX_name = "a" and XXX_type = "a" and XXXXXXXX_type = "C". Format $ amounts(dont use FORMAT_NUMBER). (exclude nulls)'}]
```

FIG. 2D

FIG. 3B
306
RO_CONTEXT = [
"role": "user",
"content": "RO stands for repair order."
"role": "user",
"content": "How many ROs were closed in May 2023?"
"role": "assistant",
"content": "{\"recipient\":\"SERVER\", \"action\":\"QUERY\", \"message\":\"SELECT SUM(XXXX) AS ROs FROM XXXXXX WHERE dxxxxxxXX='XXXXXXX' AND XXXXXX='xxxxxx' AND CALENDAR_MONTH >= '2023-05-01' AND CALENDAR_MONTH < '2023-06-01'\"}"
"role": "user",
"content": "'TOTAL_RO_COUNT\r\n344570.0000000000\r\n'"
"role": "assistant",
"content": "{\"recipient\": \"USER\", \"message\":\"XXXXXXXX XXXXXX closed a total of 344570 ROs in May 2023\"}."
"role": "user",
"content": "For closed RO related question about the TXXXXXXX use XXXXXX_XXX='TXXXXXXX', TXXXXXXX_RO_COUNT is NOT NULL and TXX_ID is NOT NULL in the where clause"
"role": "user",
"content": "For monthly closed RO related question about the TXXXXXXX use XXXXXX_XXX='TXXXXXXX', use SUM(TXXXXXXX_RO_COUNT) in select clause and TXX_ID is NOT NULL in where clause"
"role": "user",
"content": "For RO related question about the AXXXXXXX use XXXXXX_XXX='AXXXXXXX' and AXXXXXXX_RO_COUNT is NOT NULL and TXX_ID is NOT NULL in the where clause"
"role": "user",
"content": "Dont use DATEPART() or EXTRACT()"
"role": "user",
"content": "for any questions related to ROss, txxxxxROs, total ROs, exclude NULLS"
"role": "user",
"content": "to get xxxxxx related records use the condition XXXXXX='xxxxxx' in the where clause. to get xxxxxx id get TXX_ID. Always return only NOT NULL TXX_ID."
"role": "user",
"content": "to get txxxxx related records use the condition XXXXXX='txxxxx' in the where clause. to get txxxxx id get TXX_ID. Always return only NOT NULL TXX_ID."
"role": "user",
"content": "txxxxx and xxxxxx ids are in TXX_ID. Always return only NOT NULL TXX_ID."
"role": "user",
"content": "for any questions related to txxxxxs, xxxxxxs use ."
"role": "user",
"content": "for aggregations and summations XyXX of questions related to the xxxxxxs, always group by TXX_ID."
"role": "user",
"content": "for aggregations and summations XyXX of questions related to the txxxxxs, always group by TXX_ID."
"role": "user",
"content": "for questions related to aggregations and summations of the dealer balances, always group by dealer."

METHOD AND SYSTEM OF CONTEXT WINDOW ENGINEERING FOR LARGE LANGUAGE MODELS FINE-TUNED FOR CONVERSATIONS

BACKGROUND

The present disclosure relates to data access via a chatbot, where the user asks questions about the data in a natural language (e.g., plain English) and the gets the answer from a data source on a cloud. In particular, the present disclosure relates to "context window engineering" to optimize cost, decrease processing time and improve accuracy of large language models (LLMs) fine-tuned for conversations.

"Context window" is a key component when it comes to the natural language processing (NLP) and LLMs. In the context of NLP and machine learning, a context window refers to a fixed-size window that moves across a sequence of tokens (such as words or characters) in a text. The context window is used to capture the surrounding context of each token. Context windows are often used in various NLP tasks, such as part-of-speech tagging, named entity recognition, and word embeddings, where the context of a word is important in understanding its meaning or function in a sentence.

As the conversation progresses, for example, a user asks a question and LLM responds with an answer, then the user asks a follow-up question and the LLMs responds with an answer, the context window grows. In the current LLM landscape, an amount of information (e.g., a number of tokens) that can be sent to the LLM is finite. Thus, the need to manage the size of the context window arises relatively rapidly during the conversations with the conversational LLMs.

As the size of the context window size increases, a cost of interacting with the LLM increases, because the number of tokens in the context window, being sent back and forth between the user and the conversational LLM, is directly proportional to the cost of interacting with the LLM.

As the size of the context window size increases, a chance of accuracy degradation also increases. This is due to a huge context window of a wider context that would confuse the conversational LLMs. An increase in the size of the context window requires much more time for the LLM to process the context and come up with an answer.

BRIEF DESCRIPTION OF THE DRAWINGS

FIG. 2B shows an example of static context as sales context according to an embodiment of the present disclosure.

FIG. 2C shows an example of dynamic context of long term according to an embodiment of the present disclosure.

FIG. 2D shows an example of dynamic context of short term according to an embodiment of the present disclosure.

DETAILED DESCRIPTION

Various embodiments of the present disclosure will be explained below in detail with reference to the accompanying drawings. The following detailed description refers to the accompanying drawings that show, by way of illustration, specific aspects and embodiments of the disclosure. The detailed description includes sufficient detail to enable those skilled in the art to practice the embodiments of the disclosure. Other embodiments may be utilized, and structural, logical, and electrical changes may be made without departing from the scope of the present disclosure. The various embodiments disclosed herein are not necessarily mutually exclusive, as some disclosed embodiments can be combined with one or more other disclosed embodiments to form new embodiments. Thus, the following more detailed description of the embodiments of the systems, methods, and apparatuses is not intended to limit the scope of the disclosure, but is merely representative of possible embodiments of the disclosure. In some cases, well-known structures, materials, or operations are not shown or described in detail.

The present disclosure provides various embodiments of managing a context window in accessing the database. According to various embodiments, a static context and one or more dynamic contexts of one or more messages may be used for providing a context window. The present disclosure primarily provides various embodiments of managing a context window to keep its size within an acceptable context window limit of the conversational LLMs. The benefits of this context window engineering are reduction of costs associated with the interaction with the LLMs, increased accuracy of the responses from the LLMs, and decreased latency in the response from the LLMs.

Figure 1:
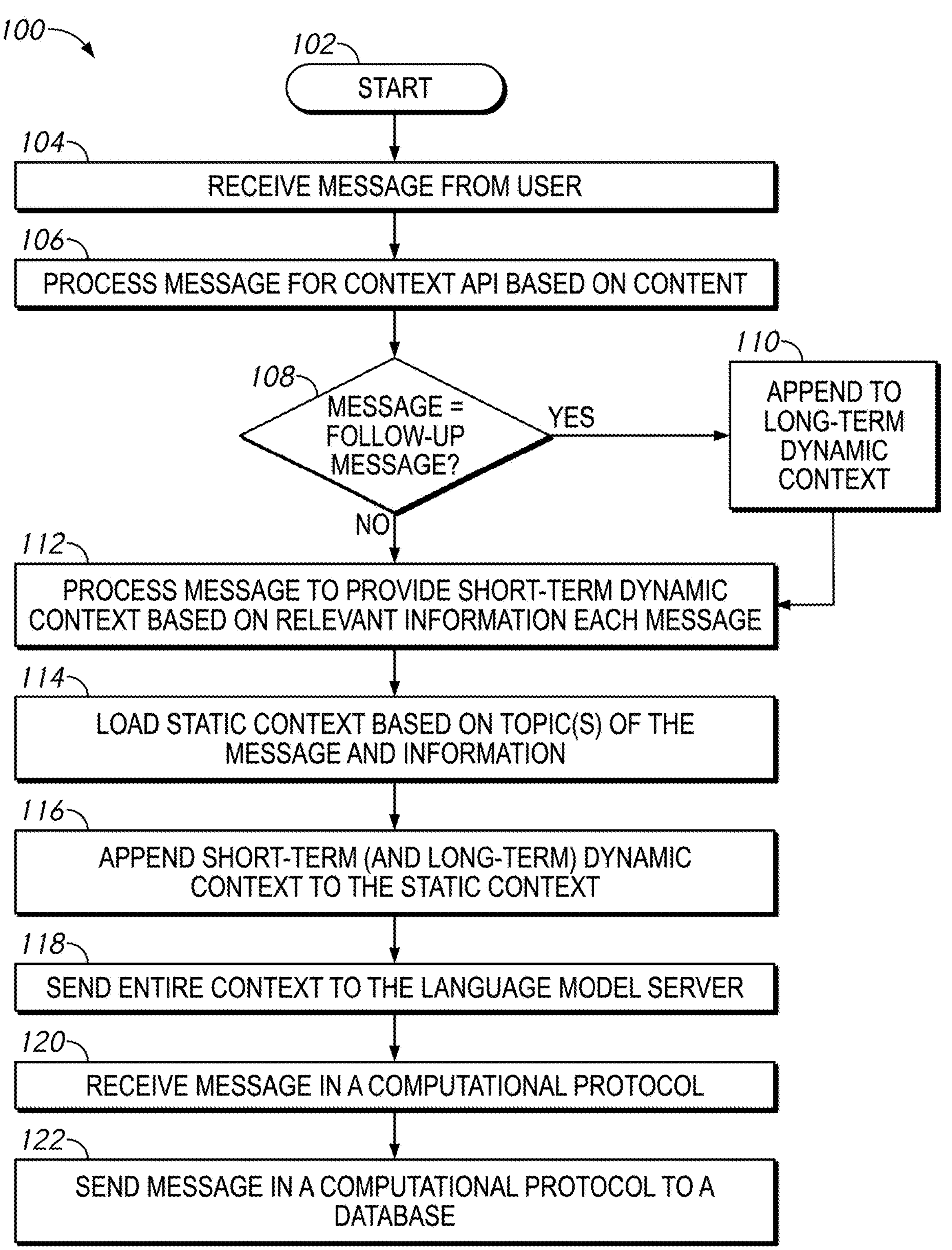
FIG. 1 is a flowchart of an example method for context window management with an LLM server for database access according to an embodiment of the present disclosure.

FIG. 1 is a flowchart of a method 100 for context window management with an LLM server for database access according to an embodiment of the present disclosure. In some embodiments, the method 100 may be performed by executing a context window manager 504 of FIG. 5. In some embodiments, executable instructions may be stored as APIs in program memory of a user machine, such as a user system 400 of FIG. 4. The method 100 may start at a block 102 responsive to user input at the user system 400. In some embodiments, the signal may be received from a user application, such as a user application 502 of FIG. 5, installed or implemented on the user system 400. In some embodiments, the user application may be implemented to function together with a user interface, such as a user interface 506 of FIG. 5, to interact with the user, receiving a message and providing a response. A message is received in the user application in a block 104 by the user interface. In some embodiments, the received message may be in a user language, such as a natural language that is used by humans. In a block 106, the message may be pre-processed based on a content in the message for a context API, such as a context API 508. For example, a question with the same substance may be provided in various expressions in the message and such expressions may be standardized in a template format. In some examples, names, such as an enterprise name and/or a store name, may be converted into identifiers, such as an enterprise ID and/or a store ID. The pre-processed message may be provided to the context API. In a block 108, the context API may determine whether the message is a follow-up message. If the message is a follow-up message, the message may be included in a long term dynamic context in a block 110. Thus, the long term dynamic context may be generated based on contents of messages.

The process proceeds to a block 112, where the message is processed to provide a short-term dynamic context based on each message. In some examples, the received pre-processed message may be pre-processed to attach relevant information as a dynamic context of a short term that is relevant to the message. The relevant information may not be explicitly included in the message itself; however, the relevant information may be communicated together with the message as the dynamic context of a short term. In some examples, the relevant information may be related to a user's affiliation (e.g., a user ID, a location/store ID, a local machine/host ID, an enterprise/company ID, a department ID, a position (category) in the department, etc.). In some examples, the relevant information may be related to a customer or a user (e.g., a customer identifier, a customer's geographical location, an article or a good that is associated with the customer, etc.). In some examples, the relevant information may be related to a date and time.

In a block 114, a static context corresponding to the one or more topics may be loaded in memory based on one or more topics of the received pre-processed message. In some examples, the static context may be based on at least one of multiple categories, including an order, sales or appointment. In some examples, a context window may be split into a plurality of sets of contexts. Each set may include a static context, dynamic contexts of short term and dynamic context of long terms. In some embodiments, the context window may be split into a set of the static context, the dynamic contexts of short term, and the dynamic context of long term upon receiving the new static context. In a block 116, the dynamic contexts, such as the dynamic contexts of short term and/or long term, if they exist, may be appended to the static context in the memory. In a block 118, the message with a context window, that is an entire context based on the pre-processed message and the static and/or dynamic contexts may be provided to one or more language model servers 514.

In a block 120, the message and the context window may be received by a language model server, such as the one or more language model servers 514. In some embodiments, interpretation or translation of the message with the context in a natural language into a computational protocol in a machine language may be performed. When the message with the context window is indicative of access to data source, such as one or more databases 512, an access command that is interpretable by the data source may be provided. In some examples, the access command may include an SQL query.

In a block 122, the access command may be provided to the data source, such as one or more databases 512. The data source may provide a return result, such as a grid of one or more rows in the databases 512. The returned result may be further interpreted or translated into a result message in the natural language of the original message. Once the result message is provided to the context API 508, the response may be generated based on the result message, and the response may be presented in graphics, voice, or text.

Figure 2A:
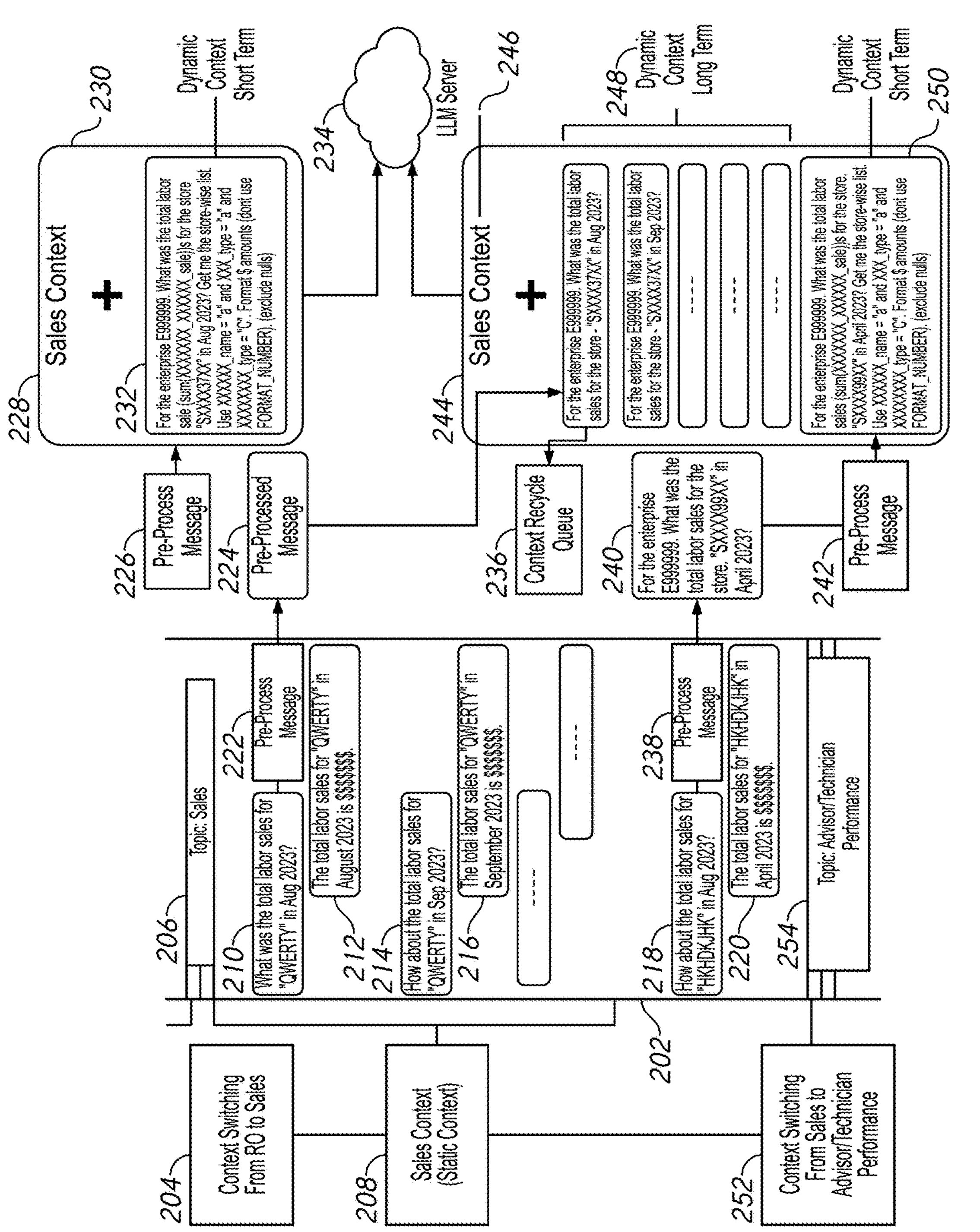
FIG. 2A is an example sequence of context window management with an LLM server for database access according to an embodiment of the present disclosure.

FIG. 2A is an example sequence of context window management with an LLM server for database access according to an embodiment of the present disclosure. FIG. 2A shows an example of a conversation window 202 and static and dynamic context preparation. FIG. 2B shows an example of static context 230 as sales context. FIG. 2C shows an example of dynamic context of long term 248. FIG. 2D shows an example of dynamic context of short term 250.

Once a context is switched 204, a group of messages 212, 214, 216, 218, and 220 are exchanged under a topic of sales 206. The topic of sales 206 may be loaded as a sales context (static context) 208. In the message 210, the user asks a question "What was the total labor sales for 'QWERTY' in August 2023?" The message 210 may be received and pre-processed 222 to a pre-processed message 224 "For the enterprise E9999999, What was the total labor sales for the store—"SXXXX37XX" in August 2023?" to include an enterprise ID E99999 and a store ID SXXXX37XX in place of a store name "QWERTY" in a natural language. The pre-processed message 224 becomes a dynamic context of long term for further conversation on this topic. In this example, the pre-processed message 224 may become a first item in the dynamic context of long term. The pre-processed message 224 may further be pre-processed 226 using relevant information to the message 212 to provide "For the enterprise E9999999, What was the total labor sale (sum (XXXXXXX_XXXXXX_sale))s for the store-"SXXXX37XX" in August 2023? Get me the store-wise list. Use XXXXXX_name="a" and XXX_type="a" and XXXXXXXX_type="C". Format $ amounts (dont use FORMAT_NUMBER). (exclude nulls)," that is a dynamic context of short term 232. Such dynamic context of short term 232 may include: XXXXXX_name="a"; XXX_type="a"; XXXXXXXX_type="C"; with a format in $ amounts. The relevant information is not limited to these examples. Thus, the static context 230 as sales context, shown in FIG. 2B, may be loaded, and the dynamic contexts of short term 232 may be appended to generate a context window 228 for the message 210. The context window 228 may be provided to the LLM server 234 for generating a database access command, such as an SQL query based on the context window 228. A response message 212 may be provided by the LLM server 234 responsive to the database inquiry result. The pre-processed message 224 may be also included in a context recycle queue 236 to be used in a dynamic context of long term 248, shown in FIG. 2C.

Another message 214 inquiring a slightly modified question, such as a modification of a month, may be received. In the message 214, the user asks a question "How about the total labor sales for 'QWERTY' in September 2023?" The message 214 may be pre-processed 222 and further pre-processed 226 as the message 210, and a dynamic context of short term for the message 214 is generated and provided to the LLM server 234 together with the pre-processed message 224 stored as the first item in the dynamic context of long term and the static context 230. The LLM server 234 may provide a response message 216 based on the database inquiry result. The dynamic context of short term for the message 214 may be appended to the dynamic context of long term for further conversation on this topic.

While several messages are exchanged, a dynamic context for long term 248 may continue to develop. In another inquiry message 218, the user asks a question "How about the total labor sales for 'HKHDKJHK' in April 2023?" The message 218 may be received and pre-processed 238 to generate a pre-processed message 240 "For the enterprise E9999999, What was the total labor sales for the store—'SXXXX99XX' in April 2023?" including a new store ID "SXXXX99XX" in place of a store name "HKHDKJHK" in a natural language. The pre-processed message 240 may be pre-processed 242 to provide a dynamic context of short term 250 using relevant information to the message 212. Such dynamic context of short term 232 may include: XXXXXX_name="a"; XXX_type="a"; XXXXXXXX_type="C"; with a format in $ amounts; and forbidding FORMAT_NUMBER. The relevant information is not limited to these examples. The static context 246 as sales context, shown in FIG. 2B, may be loaded, and the dynamic context of long term 248 built from prior pre-processed questions of the user, and the dynamic context of short term 250 may be provided to the LLM server 234 as an entire context 244 for the message 218. The LLM server 234 may generate a database access command, such as an SQL query based on the context 244. A response message 220 may be provided responsive to the database inquiry result. The pre-processed message 240 may be added into a dynamic context of long term 248 for further conversation, if any, on this topic.

When a topic is changed to advisor/technician performance 254 in a next message (not shown), another context switching 252 from sales to advisor/technician performance occurs. In some embodiments, a context window may be split to provide a new window with a new set of contexts, including a static context based on the topic advisor/technician performance 254, dynamic contexts of short term and dynamic context of long terms, responsive to the context switching 252. By the context switching 252, a static context may be switched to a context of advisor/technician performance.

The above sequences for loading static context and appending dynamic context(s) are merely examples. The static context and dynamic contexts may not be limited to examples described herein.

Figure 3A:
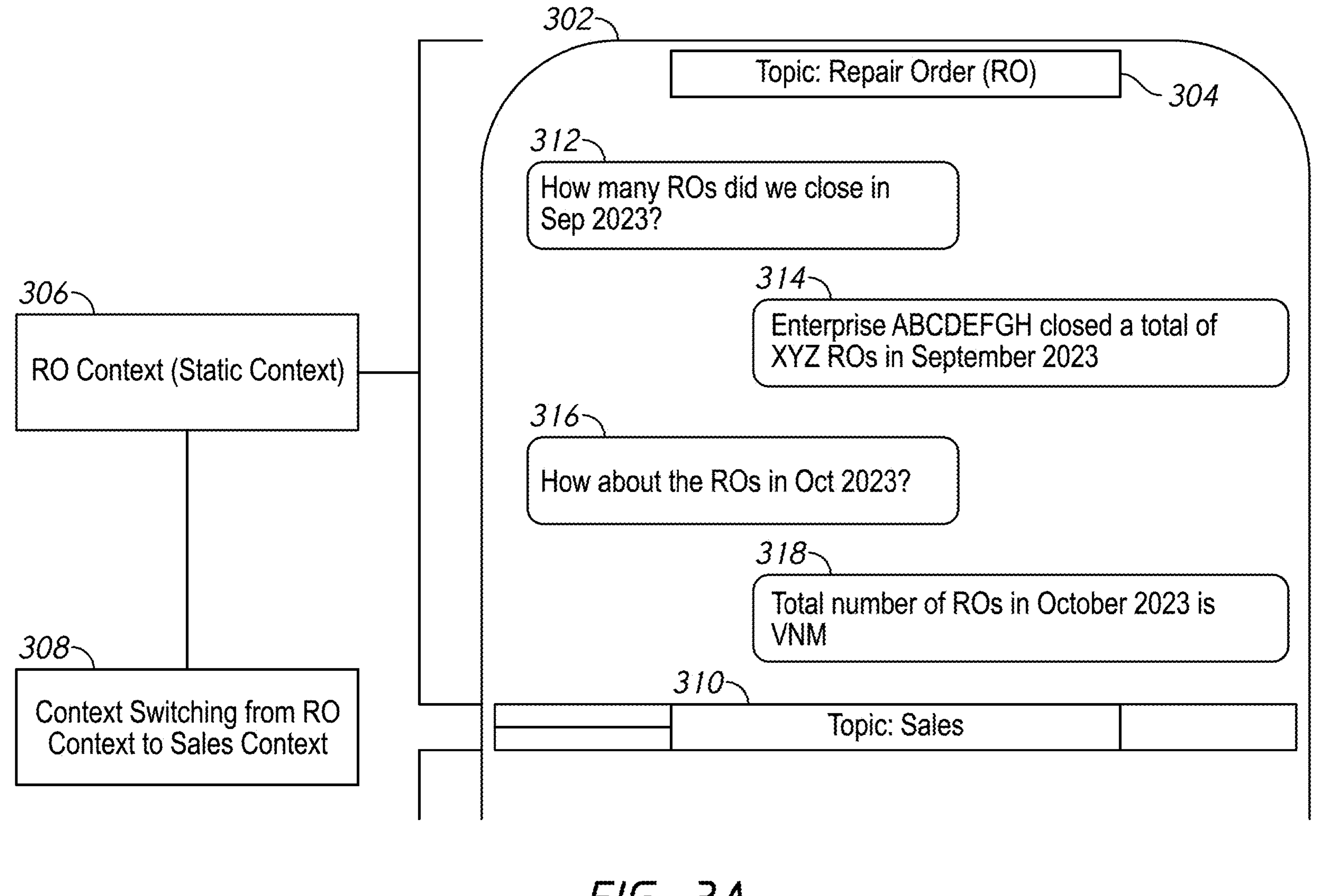
FIG. 3A is an example sequence of context window management with an LLM server for database access according to an embodiment of the present disclosure.
Figure 3B:
FIG. 3B shows an example of a repair order (RO) context (static context) according to an embodiment of the present disclosure.

FIG. 3A is an example sequence of context window management with an LLM server for database access according to an embodiment of the present disclosure. FIG. 3A shows an example of a conversational window 302 and static context preparation. FIG. 3B shows an example of a repair order (RO) context (static context) 306 according to an embodiment of the present disclosure.

In this example sequence, a group of messages 312, 314, 316 and 318 are exchanged under a topic of repair order (RO) 304. The topic of RO 304 may be loaded as a RO context (static context) 306. Following the group of messages 312, 314, 316 and 318, static context switching from RO context to sales context 308 occurs. In some embodiments, a context window may be split to provide a new window with a new set of contexts, responsive to the context switching 308. By the context switching 308, and static context may be switched to a context of sales, and following messages (not shown) are exchanged under a topic of sales 310.

Figure 4:
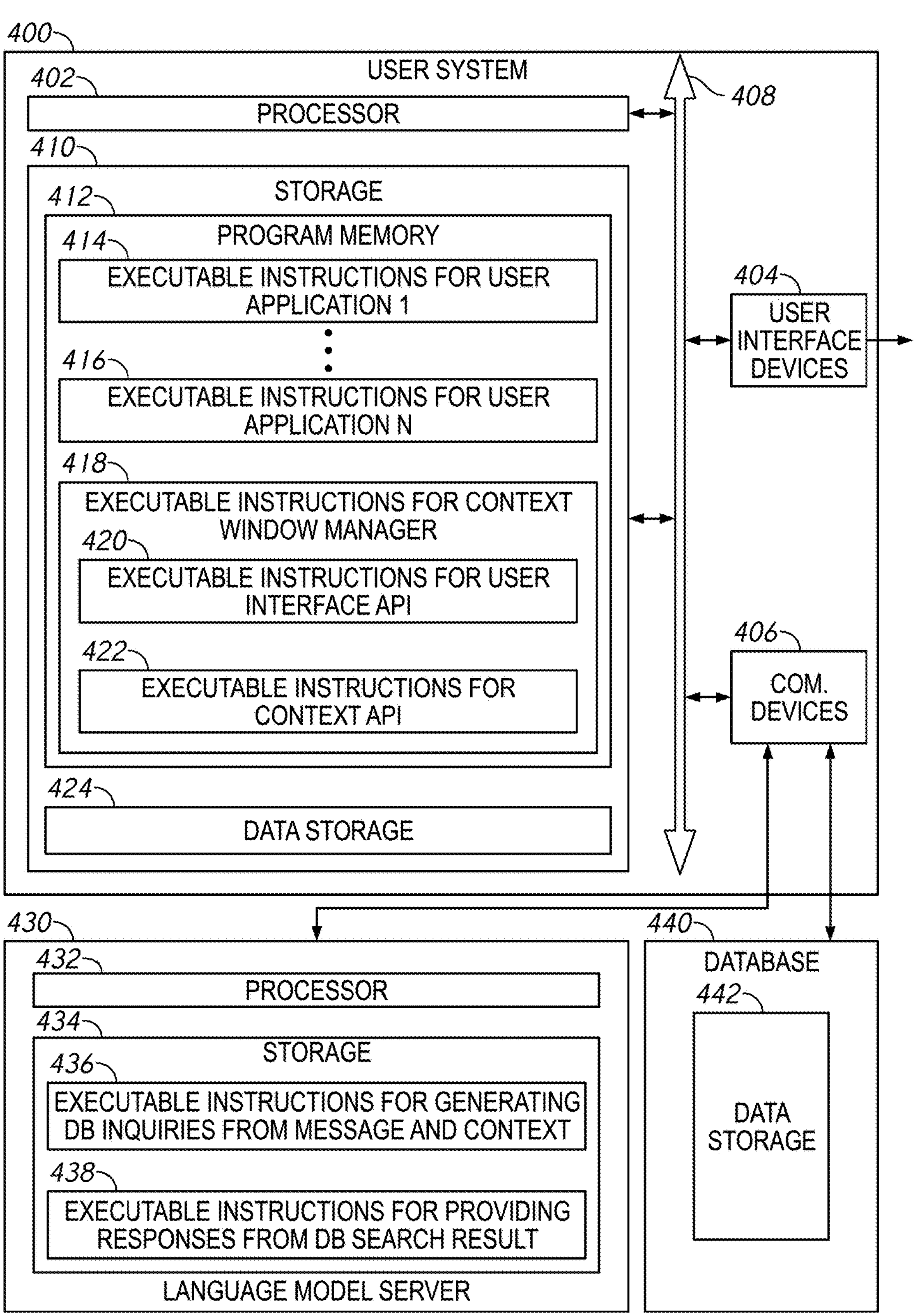
FIG. 4 is a block diagram of an example user system for context window management with an LLM server for database access according to an embodiment of the present disclosure.

FIG. 4 is a block diagram of an example user system 400 for context window management with an LLM server for database access according to an embodiment of the present disclosure. In some embodiments, the user system 400 may be one or more computers. The one or more computers may be, for example, a laptop computer, a desktop computer, or a tablet. In some examples, the user system 400 may be implemented as a user computer that executes a user application 502 in FIG. 5 and a back-end host computer that executes application program interfaces, such as a context window manager 504 of FIG. 5, including a user interface 506 and a context API 508. In some examples, the user system 400 may be a user computer that executes the user application 502 and application program interfaces, such as the context window manager 504 of FIG. 5, including the user interface 506 and the context API 508.

The user system 400 may include one or more processors 402, a storage 410, user interface devices 404, communication devices 406 and a bus 408. The one or more processors 402 may include, for example, a central processor unit (CPU), a reduced instruction set computer (RISC) processor, a complex instruction set computer (CISC) processor, a graphical processor unit (GPU), a digital signal processor (DSP) such as a baseband processor, an application-specific integrated circuit (ASIC), another processor, or any suitable combination thereof. In some embodiments, a number of the one or more processors 402 may be one. The one or more processors 402 may access the storage 410, the user interface devices 404, and the communication devices 406 through the bus 408. The user interface devices 404 may include input devices that accept entries by a user, and output devices that provide information to the user. The input devices may include, for example, a mouse, a keyboard, a microphone and/or a camera. The output devices may include, for example, a display, one or more speakers, such as earphones or headphones, a printer, etc. In some examples, the display together with the mouse and keyboard may provide a GUI, and the microphone and the one or more speakers may provide a voice UI. The storage 410 may include main memory, disk storage, or any suitable combination thereof. The storage 410 may include, but is not limited to, any type of volatile or non-volatile memory such as dynamic random access memory (DRAM), static random access memory (SRAM), erasable programmable read-only memory (EPROM), electrically erasable programmable read-only memory (EEPROM), flash memory, solid-state storage, etc. In some embodiments, the storage 410 includes program memory 412 that may store software, a program, an application, an applet, an app, or other executable code including instructions for causing at least any of one or more processors 402 to perform any one or more of the methods discussed herein. According to some example embodiments, the one or more processors 402 may be able to read instructions from a machine-readable or computer-readable medium (e.g., a non-transitory machine-readable storage medium), such as the storage 410, and perform any one or more of the methods discussed herein, such as processes in FIG. 1. The storage 410 may also include a data storage 424 that may store data. The communication devices 406 may include hardware, software, or both providing one or more interfaces for communication (such as, for example, packet-based communication) between the user system 400 and one or more other computers, such as a language model server 430 and/or a database 440 via one or more networks by wireless or wired internet/intranet communications. The wireless communications may include, for example, Wi-Fi, a cellular telecommunication such as CDMA, GSM, EV-DO, 3G, 4G, and 5G, etc., a short distance communication such as Bluetooth, near filed communications (NFC), etc. The wired communications may include communication via an Ethernet, etc.

The processor 402 may include hardware for executing instructions, such as those stored in program memory 412 of the storage 410. The program memory 412 may include executable instructions that may be executed by the processor 402. In some embodiments, the executable instructions stored in the program memory 412 may be implemented as application program interfaces. In some examples, the executable instructions stored in the program memory 412 may include executable instructions for user applications 414-416, and executable instructions for context window manager 418 including executable instructions for user interface API 420 and executable instructions for context API 422. The executable instructions for user applications 414-416 may cause the processor 402 to execute instructions corresponding user applications, such as the user applications 502 of FIG. 5. The executable instructions for user interface API 420 may cause the processor 402 to perform as the user interface 506 of FIG. 5. The executable instructions for context API 422 may cause the processor 402 to perform as the context API 508 of FIG. 5.

The language model server 430 may include one or more processors 432 and a storage 434. The one or more processors 432 may include, for example, a central processor unit (CPU), a reduced instruction set computer (RISC) processor, a complex instruction set computer (CISC) processor, a graphical processor unit (GPU), a digital signal processor (DSP) such as a baseband processor, an application-specific integrated circuit (ASIC), another processor, or any suitable combination thereof. In some embodiments, a number of the one or more processors 432 may be one. The storage 434 may also include a data storage (not shown) that may store data. The storage 434 may include main memory, disk storage, or any suitable combination thereof. The storage 434 may include, but is not limited to, any type of volatile or non-volatile memory such as dynamic random access memory (DRAM), static random access memory (SRAM), erasable programmable read-only memory (EPROM), electrically erasable programmable read-only memory (EEPROM), flash memory, hard disk, solid-state storage, etc. In some embodiments, the storage 434 includes program memory that may store software, a program, an application, an applet, an app, or other executable code including instructions for causing at least any of one or more processors 432 to perform any one or more of the methods discussed herein. According to some example embodiments, the one or more processors 432 may be able to read instructions from a machine-readable or computer-readable medium (e.g., a non-transitory machine-readable storage medium), such as the storage 434, and perform any one or more of the methods discussed with regards to FIG. 5. The language model server 430 may communicate with the user system 400 by wireless or wired internet/intranet communications. The wireless communications may include, for example, Wi-Fi, a cellular telecommunication such as CDMA, GSM, EV-DO, 3G, 4G, and 5G, etc., a short distance communication such as Bluetooth, or near filed communications (NFC), etc. The wired communications may include communication via an Ethernet, etc.

The processor 432 may include hardware for executing instructions, such as those stored in program memory of the storage 434. The storage 434 may include executable instructions that may be executed by the processor 432. In some embodiments, the executable instructions may be implemented as a large language model (LLM) that has been trained using a large set of language data. In some examples, the executable instructions stored in the storage 434 may include executable instructions for generating DB inquiries from message and context 436 and executable instructions for providing responses from DB search result 438. The executable instructions for generating DB inquiries from message and context 436 may cause the processor 432 to execute instructions that generate an access command based on the message and the context from the user system 400 in a machine language compliant with a computational protocol. In some examples, the access command may include an SQL query. The executable instructions for providing responses from DB search result 438 may cause the processor 402 to execute instructions that receive a return result, such as a grid of one or more rows stored in data storage 442 in the databases 440 and further generate a result message in the original language of the message. The user system 400 may receive the result message, and the executable instructions for user interface API 420 may provide a response based on the result message, that may be presented in graphics, voice, or text via the one or more user interface devices 404.

Figure 5:
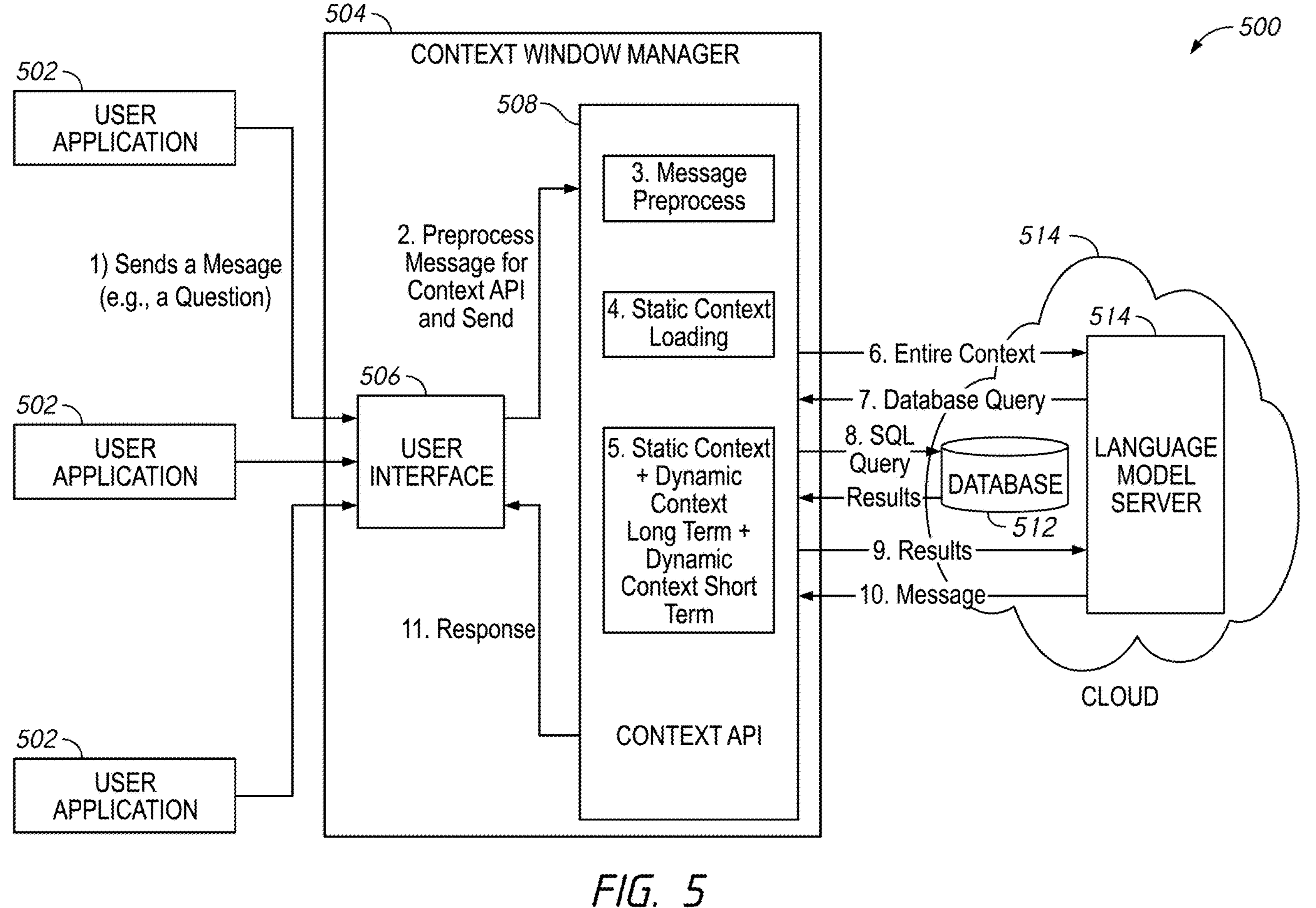
FIG. 5 is a schematic diagram of a system including a context window manager and an LLM server for database access according to an embodiment of the present disclosure.

FIG. 5 is a schematic diagram of a system 500 including a context window manager 504 and an LLM server for database access according to an embodiment of the present disclosure. The system 500 includes one or more user applications 502 and the context window manager 504. In some embodiments, the one or more user applications 502 may include retail analytics, scheduling tools and customer relationship management tools. For example, the system 500 may communicate with one or more databases 512 and one or more language model servers 514. In some embodiments, the one or more databases 512 and the one or more language model servers 514 may be configured on a network, such as a cloud 510. In some examples, the one or more language model servers 514 may be a conversational large language model (LLM) server or a chatbot. For example, the one or more language model servers 514 may be equipped with an artificial intelligence (AI), such as chatGPT, Bard, Bing, etc.

In some embodiments, the context window manager 504 may be implemented as an application programming interface that is executed on each user application 502. In other embodiments, the context window manager 504 and the user applications 502 may communicate with wire (e.g., located at an identical site) or wirelessly. The context window manager 504 may include a user interface 506. In some embodiments, the user interface 506 may include a user interface for the language model servers 514. In some embodiments, one or more components of the user interface 506 may be configured to be pluggable. In some examples, the user interface 506 may be a graphical user interface (GUI) that may provide graphical interactions with a user that allows text-based conversation (e.g., chat). In some examples, the user interface 506 may be a voice user interface that may provide conversational interactions with the user using speech technology. The user interface 506 may receive a message, such as a question, from each user application 502 from the user. In some embodiments, the message may be provided in a natural language used by humans (e.g., English, French, Spanish, etc.). The question in the message may lead to a data inquiry that leads to database access. The message as is may not be used for accessing the one or more databases database 512.

The context window manager 504 may include an application programming interface, such as a context API 508. In some embodiment, the user interface 506 may pre-process the message, such as a question, to be handled by the context API 508, and provide the pre-processed message to the context API 508. In some examples, pre-processing the message into a standardized format that is compliant with the language model servers 514. In some examples, preprocessing may include simple data conversions, such as an enterprise name into an enterprise identifier (ID) and/or a store name into a store ID. The context API 508 may receive the pre-processed message. In some embodiments, the pre-processed message from the user interface 506 may be integrated into a dynamic context of a long term once a next message is received. Thus, the dynamic context of a long term may include contents from a plurality of messages including a current message and one or more previous messages. The dynamic context of a long term is specific to each topic, the dynamic context of a long term expires when a user switches to a new topic. The dynamic context of a long term may stay with the user application 502. The dynamic context of a long term based on messages may not pollute the static context, as it lapses once the user changes a topic. As the growth of the dynamic context of a long term terminates together with switching the topic, a token count for communicating this type of context stays under control. In some examples, when a token count in the context window becomes equal to a maximum number of tokens for the context window messages in the dynamic context long term may be deleted on first-in-first-out (FIFO) basis. For example, the dynamic context long term may be configured as a FIFO, when the token count reaches the maximum number of tokens, the oldest message in the FIFO will be deleted first. Thus, later messages may remain in the context window. By using the latest message in the dynamic context long term, it is not necessary to switch to higher allowances of a context window to accommodate lengthy conversation of messages.

The received pre-processed message may be pre-processed to attach relevant information associated with the message as a dynamic context of a short term, regardless of inclusion in the content of the message. In some examples, the relevant information may be related to a user's affiliation (e.g., a user ID, a location/store ID, a local machine/host ID, an enterprise/company ID, a department ID, a position (category) in the department, etc.). In some examples, the relevant information may be related to a customer or a user (e.g., a customer identifier, a customer's geographical location, an article or a good that is associated with the customer, etc.). In some examples, the relevant information may be related to a date and time. The dynamic context of a short term is specific to the message, and it expires one a response to the message is returned. The dynamic context of a short term does not influence other contexts, because it is not integrated into the static or long-term dynamic context. The dynamic context of a short term may also contribute to token count reduction.

Based on one or more topics of the received pre-processed message, the context API 508 may load a static context corresponding to the one or more topics in memory. In some examples, the static context may be based on at least one of multiple categories, including service orders (e.g., repair orders), sales or appointments. For a duration of a conversation including a sequence of messages on a topic, the static context is set once. The static context continues to be part of a payload including the message until the user changes a topic. Since the static context is topic-based and not all-in-one (catering to all topics), the static context may reduce a size of context window. The context API 508 may further append dynamic contexts, such as the dynamic contexts of short term and/or long term, to the static context in the memory by the context API 508. Thus, the context API 508 may generate a message with an entire context based on the pre-processed message and the static and/or dynamic contexts, and provide the message and the entire context to the one or more language model servers 514.

The one or more language model servers 514 may receive the message and the entire context. In some embodiments, the one or more language model servers 514 may perform interpretation or translation between natural languages and machine languages. When the message with the entire context is indicative of access to one or more databases 512, the language model servers 514 may provide an access command that is interpretable by the one or more databases 512 to the context API 508. In some examples, the access command may include an SQL query.

The context API 508 may provide the SQL query to the one or more databases 512. In some examples, the one or more databases 512 may be a data source. The one or more databases 512 may provide a return result, such as a grid of one or more rows in the databases 512 to the context API 508. The context API 508 may provide the returned result to the one or more language model servers 514 to interpret the returned result into a result message in the natural language of the original message. Once the one or more language model servers 514 provide the result message to the context API 508, the context API 508 may provide a response based on the result message to the user interface 506. The response may be presented in graphics, voice, or text.

As described above, methods and systems of context window management for database access using a conversational LLM server has been described herein. The present disclosure provides various embodiments of managing a context window to keep its size, such as a number of tokens, within an acceptable context window limit of the conversational LLMs. The benefits of this context window engineering are reduction of costs associated with the interaction with the LLMs, increased accuracy of the responses from the LLMs, and decreased latency in the response from the LLMs.

The systems disclosed herein may include one or more processors and/or controllers using instructions present thereon to implement one or more functionalities of each such power adapter as those functionalities are described herein. The instructions used by such processors and/or controllers may be stored on a non-transitory computer-readable storage medium on (or in communication with) such controllers and/or processors. It is anticipated that these processors and/or controllers (and associated non-transitory computer-readable instructions for use thereon) may be present in any embodiment disclosed herein (even if not explicitly discussed).

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims.

From the foregoing it will be appreciated that, although specific embodiments of the disclosure have been described herein for purposes of illustration, various modifications may be made without deviating from the spirit and scope of the disclosure. Accordingly, the scope of the disclosure should not be limited any of the specific embodiments described herein.

What is claimed is:

1. A method comprising:

receiving a message in a user language;

preprocessing the message;

setting a static context based on a topic of the message for a text sequence including the message, if the topic is new or different from a topic of an immediately preceding message;

attaching the static context to a context window;

attaching a dynamic context of long term to the context window based on the message and one or more previous messages, if any, in the text sequence;

attaching a dynamic context of short term to the context window based on the message, the dynamic context of short term specific to the message and expires once a response to the message is returned;

providing the context window to a language model server;

receiving a database access command based on the context window from the language model server;

providing the database access command to a database; and receiving a result response to the database access command from the database.

2. The method of claim 1, further comprising:

providing the result to the language model server;

receiving the result in the user language from the language model server; and providing the result response in the user language.

3. The method of claim 1, splitting the context window into:

the static context;

the dynamic context of long term; and the dynamic context of short term.

4. The method of claim 1, wherein said attaching the dynamic context comprises providing relevant information to the message.

5. The method of claim 1, further comprising:

storing the one or more contexts in a queue; and processing a next message using the message associated with the one or more contexts.

6. The method of claim 1, further comprising loading a static context in memory based on one or more topics of the message.

7. The method of claim 6, wherein the static context is based on at least one of multiple topics including an order, sales or appointment.

8. The method of claim 6, wherein said attaching the dynamic context of long term comprises providing the dynamic context of long term over a period of the text sequence including the message on the one or more topics, based on one or more contents of the message and one or more previous messages, and wherein the message is a follow-up message of the previous message.

9. The method of claim 1, wherein the dynamic context of short term is specific to the message, wherein the dynamic context of short term expires after receiving the result response.

10. The method of claim 1, further comprising deleting one or more messages in the dynamic context long term on a first-in-first-out (FIFO) basis, when a token count in the context window becomes equal to a maximum number of tokens for the context window.

11. A non-transitory computer-readable storage medium, the computer-readable storage medium including instructions that when executed by a computer, cause the computer to:

receive a message in a user language;

preprocessing the message;

set a static context based on a topic of the message for a text sequence including the message, if the topic is new or different from a topic of an immediately preceding message;

attach the static context to a context window;

attach a dynamic context of long term to the context window based on the message and one or more previous messages, if any, in the text sequence;

attach a dynamic context of short term to the context window based on the message, the dynamic context of short term specific to the message and expires once a response to the message is returned;

provide the context window to a language model server;

receive a database access command based on the context window from the language model server;

provide the database access command to a database; and receive a result response to the database access command from the database.

12. The computer-readable storage medium of claim 11, wherein the instructions further configure the computer to:

provide the result to the language model server;

receive the result in the user language from the language model server; and provide the result response in the user language.

13. The computer-readable storage medium of claim 11, wherein said attach the dynamic context comprises provide relevant information to the message.

14. The computer-readable storage medium of claim 11, wherein the instructions further configure the computer to:

store the one or more contexts in a queue; and process a next message using the message associated with the one or more contexts.

15. The computer-readable storage medium of claim 11, wherein the instructions further configure the computer to load a static context in memory based on one or more topics of the message.

16. The computer-readable storage medium of claim 15, wherein the static context is based on at least one of multiple topics including at least one of an order, sales or appointment.

17. The computer-readable storage medium of claim 15, wherein said attach the dynamic context of long term comprises provide the dynamic context of long term over a period of the text sequence including the message on the one or more topics, based on one or more contents of the message and one or more previous messages, and wherein the message is a follow-up message of the previous message.

18. The computer-readable storage medium of claim 11, wherein the dynamic context of short term is specific to the message, and wherein the dynamic context of short term expires after receiving the result response.

19. The computer-readable storage medium of claim 11, wherein the instructions further configure the computer to delete one or more messages in the dynamic context long term on a FIFO basis, when a token count in the context window becomes equal to a maximum number of tokens for the context window.

20. A computing apparatus comprising:

a processor; and a memory storing instructions that, when executed by the processor, configure the apparatus to:

receive a message in a user language;

preprocess the message;

set a static context based on a topic of the message for a text sequence including the message, if the topic is new or different from a topic of an immediately preceding message;

attach the static context to a context window;

attach a dynamic context of long term to the context window based on the message and one or more previous messages, if any, in the text sequence;

attach a dynamic context of short term to the context window based on the message, the dynamic context of short term specific to the message and expires once a response to the message is returned;

provide the context window to a language model server;

receive a database access command based on the context window from the language model server;

provide the database access command to a database; and receive a result response to the database access command from the database.

21. The computing apparatus of claim 20, wherein the instructions further configure the apparatus to:

provide the result to the language model server;

receive the result in the user language from the language model server; and provide the result response in the user language.

22. The computing apparatus of claim 20, wherein said attach the dynamic context comprises provide relevant information to the message.

23. The computing apparatus of claim 20, wherein the instructions further configure the apparatus to:

store the one or more contexts in a queue; and process a next message using the message associated with the one or more contexts.

24. The computing apparatus of claim 20, wherein the instructions further configure the apparatus to load a static context in memory based on one or more topics of the message.

25. The computing apparatus of claim 24, wherein the static context is based on at least one of multiple topics including at least one of an order, sales or appointment.

26. The computing apparatus of claim 24, wherein said attach the dynamic context of long term comprises provide the dynamic context of long term over a period of the text sequence including the message on the one or more topics, based on one or more contents of the message and one or more previous messages, and wherein the message is a follow-up message of the previous message.

27. The computing apparatus of claim 20, wherein the dynamic context of short term is specific to the message, and wherein the dynamic context of short term expires after receiving the result response.

28. The computing apparatus of claim 20, wherein the instructions further configure the apparatus to delete one or more messages in the dynamic context long term on a FIFO basis, when a token count in the context window becomes equal to a maximum number of tokens for the context window.

* * * * *